United States Patent
Abramovsky et al.

(10) Patent No.: US 12,342,390 B2
(45) Date of Patent: Jun. 24, 2025

(54) RACH RESPONSE PREAMBLE PRIORITIZATION

(71) Applicant: Parallel Wireless, Inc., Nashua, NH (US)

(72) Inventors: Benjamin Abramovsky, Petah Tiqwa (IL); Ido Shaked, Alfei Menashe (IL); Nimrod Gradus, Givatayim (IL)

(73) Assignee: Parallel Wireless, Inc., Nashua, NH (US)

( * ) Notice: Subject to any disclaimer, the term of this patent is extended or adjusted under 35 U.S.C. 154(b) by 264 days.

(21) Appl. No.: 17/845,952

(22) Filed: Jun. 21, 2022

(65) Prior Publication Data

US 2022/0408496 A1 Dec. 22, 2022

Related U.S. Application Data

(60) Provisional application No. 63/212,149, filed on Jun. 18, 2021.

(51) Int. Cl.
*H04W 74/0833* (2024.01)
*H04W 74/08* (2009.01)

(52) U.S. Cl.
CPC ... *H04W 74/0841* (2013.01); *H04W 74/0875* (2013.01)

(58) Field of Classification Search
None
See application file for complete search history.

(56) References Cited

U.S. PATENT DOCUMENTS

| | | | |
|---|---|---|---|
| 9,420,582 B2 | 8/2016 | Hooli et al. | |
| 9,426,828 B1* | 8/2016 | Singh | H04W 72/54 |
| 9,924,542 B2 | 3/2018 | Eriksson et al. | |
| 2016/0174261 A1 | 6/2016 | Yang et al. | |
| 2017/0078933 A1 | 3/2017 | Li et al. | |
| 2017/0273115 A1* | 9/2017 | Zhou | H04L 5/0053 |
| 2018/0124835 A1* | 5/2018 | Lee | H04W 48/10 |
| 2020/0351853 A1 | 11/2020 | Xiong et al. | |
| 2021/0307073 A1* | 9/2021 | Huang | H04W 74/006 |
| 2022/0022270 A1* | 1/2022 | Sevindik | H04W 74/0875 |
| 2023/0084936 A1* | 3/2023 | Shaked | H04W 74/0833 370/335 |
| 2023/0388971 A1* | 11/2023 | Bergström | H04W 72/20 |

* cited by examiner

*Primary Examiner* — Anh Vu H Ly
(74) *Attorney, Agent, or Firm* — Michael Y. Saji, Reg. No. 66291

(57) ABSTRACT

A method, computer-readable media and system for providing Random Access Channel (RACH) response preamble prioritization are presented. In one embodiment a method includes receiving, from a RACH receiver at a Preamble Prioritization Element (PPE), a list of detected preambles from a plurality of User Equipment (UE) devices, the preambles having a configured priority for different preamble groups; providing, by the PPE, an ordered prioritized list of the detected preambles; and forwarding, by the PPE to a RACH response element, a predetermined number of detected preambles from the ordered prioritized list.

12 Claims, 6 Drawing Sheets

RACH RESPONSE PREAMBLE PRIORITIZATION

CROSS-REFERENCE TO RELATED APPLICATIONS

This application claims priority under 35 U.S.C. § 119(e) to U.S. Provisional Pat. App. No. 63/212,149, filed Jun. 18, 2021, titled "RACH Response Preamble Prioritization" which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

In LTE, UEs can access eNB by sending RACH message. This message includes one of max 64 sequence of bits called preambles that enable to identify each accessing UE by the ID of the preamble it sent when responding to its RACH message.

As large number of UEs can send RACH at the same RACH slot, identifying multiple UEs is possible as one of them picks randomly preamble to use for its own RACH message. The preamble are orthogonal and PHY RACH Receiver component can usually identify several preambles per RACH slot (usually with degraded detection performance).

The LTE Standard allows the eNB to create 3 pools: Group A, Group B for Random access and the 3rd pool is reserved for dedicated preambles used for example to serve UEs which perform Handover to the eNB from neighboring cell

SUMMARY

LTE/4G allows UEs to initiate communication with the eNB. As Different pools of preambles exist for different purposes, we use in this invention to prioritize answering to preambles from one group over the others. By using this approach, we can guaranty that even when many UEs are trying to access the eNB through RACH, the eNB can maintain for example short access time for UEs doing handover even at extreme load conditions.

In one example a method for providing Random Access Channel (RACH) response preamble prioritization includes receiving, from a RACH receiver at a Preamble Prioritization Element (PPE), a list of detected preambles from a plurality of User Equipment (UE) devices, the preambles having a configured priority for different preamble groups; providing, by the PPE, an ordered prioritized list of the detected preambles; and forwarding, by the PPE to a RACH response element, a predetermined number of detected preambles from the ordered prioritized list.

In another example embodiment a computer-readable media includes instructions for providing Random Access Channel (RACH) response preamble prioritization, which, when executed, cause the system to perform steps comprising: receiving, from a RACH receiver at a Preamble Prioritization Element (PPE), a list of detected preambles from a plurality of User Equipment (UE) devices, the preambles having a configured priority for different preamble groups; providing, by the PPE, an ordered prioritized list of the detected preambles; and forwarding, by the PPE to a RACH response element, a predetermined number of detected preambles from the ordered prioritized list.

In another example embodiment a system for providing Random Access Channel (RACH) response preamble prioritization incudes: a Preamble Prioritization Element (PPE); a RACH receiver in communication with the PPE; a RACH response element in communication with the PPE; wherein the PPE receives, from the RACH receiver, a list of detected preambles from a plurality of User Equipment (UE) devices, the preambles having a configured priority for different preamble groups; wherein the PPE provides, an ordered prioritized list of the detected preambles; and wherein the PPE forwards to the RACH response element, a predetermined number of detected preambles from the ordered prioritized list.

DETAILED DESCRIPTION

In urban area there can be cases where there is very high load on the RACH slots where many UEs try to send RACH messages in parallel. The eNB has a limited number of preambles it can detect in parallel and it has limited resources of preambles it can answer with a RACH response message over the response window time due to the fact that the eNB cannot allocate all its resources to answering preambles as it also needs to provide data and calls services to other connected UES.

Big load on RACH slot can lead to increased access time to the eNB and degrade handover performance dramatically if other RACHs are prioritized due to better SNR or chosen randomly.

Figure 1:
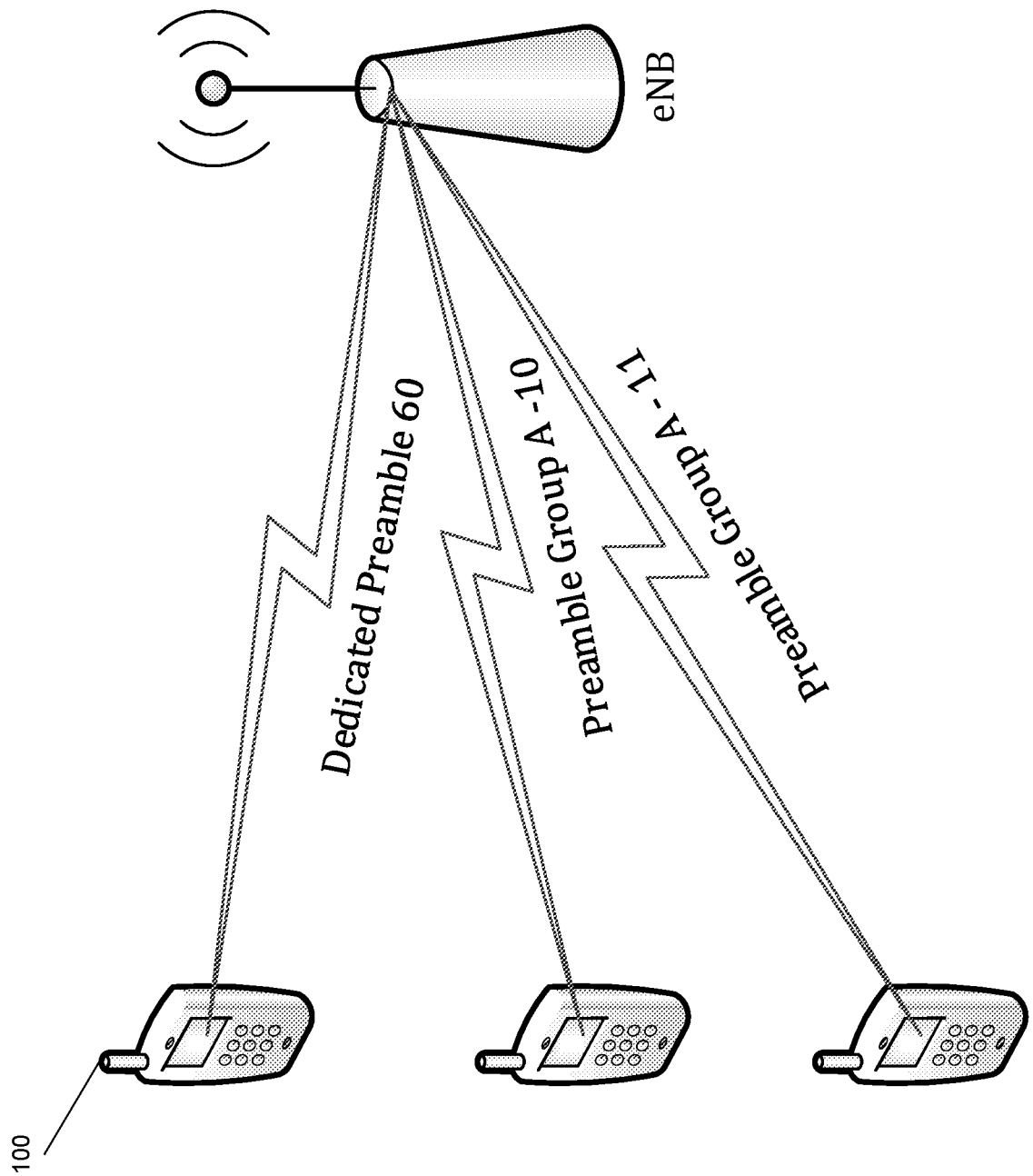
FIG. 1 is a diagram of a system for providing RACH response preamble prioritization, in accordance with some embodiments.

FIG. 1 shows a system 100 having multiple UEs with different preambles in wireless communication with a base station.

Solution to Problem

As solution to the problem, we propose to allow the operator to configure the priority of the different preamble groups. This will allow the Operator to prioritize dedicated handover over other detected Preambles and send first RAR (RACH Response) message to UEs that send dedicated preamble and indicate that it is requiring to access the cell due to incoming handover. These steps may be performed at a coordinating gateway such as the one shown in FIG. 5. In a coordinating gateway, all or some of the functions thereof could be provided using virtualization technology, including virtual machines or containers, and including cloud interfaces such as HTTP REST API interfaces.

Figure 2:
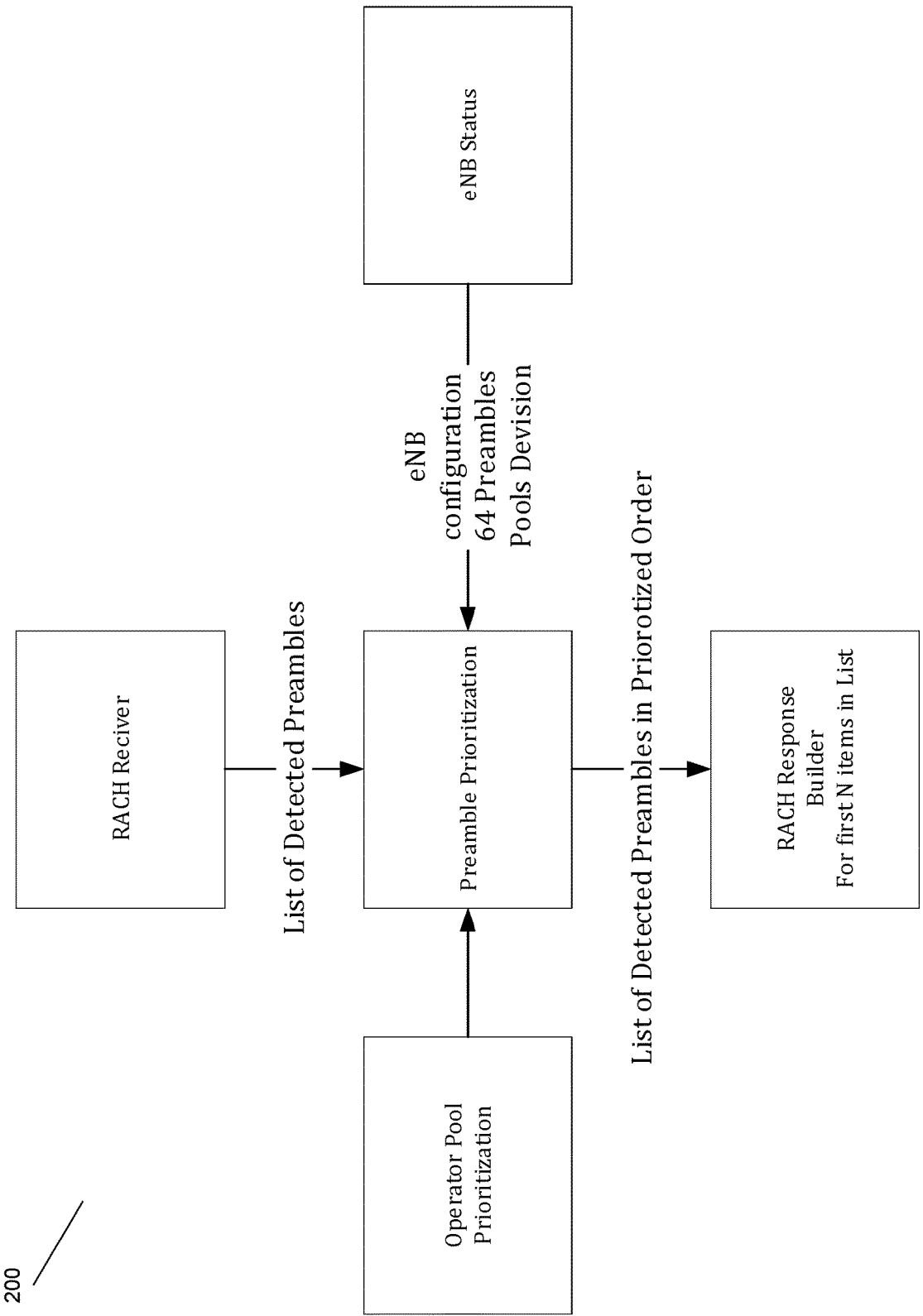
FIG. 2 is an architecture diagram, in accordance with some embodiments.

FIG. 2 shows an architecture 200 for RACH response preamble prioritization. It is allowing PW eNB guaranty short time to do handover even when the RACH load on cell is very high. We use the preamble type and not only look on the received preamble SNR. Every eNB with ability to detect more than one preamble per RACH slot will suffer from this problem. The eNB can detect several preambles sent by UEs in single RACH slot.

Figure 3:
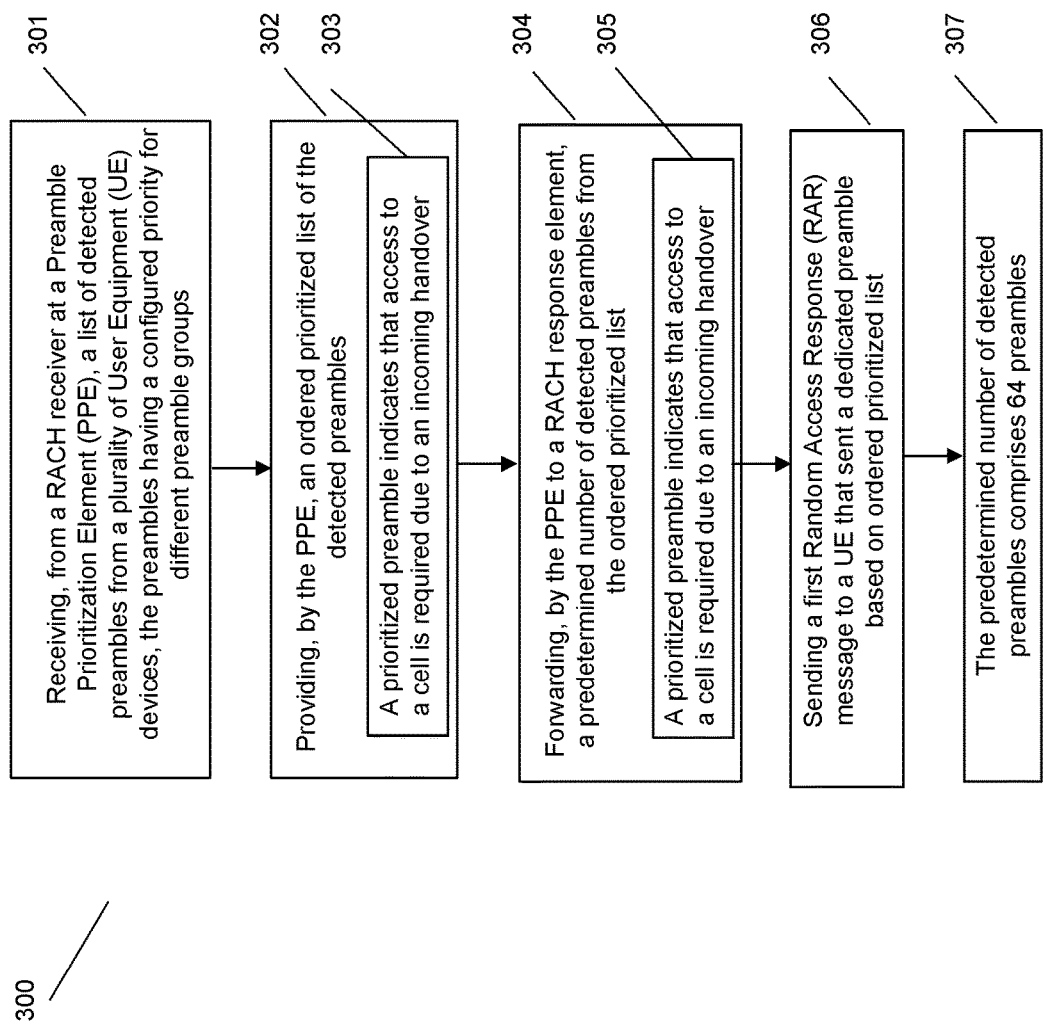
FIG. 3 is a flow diagram of a method for providing RACH response preamble prioritization, in accordance with some embodiments.

FIG. 3 is a flow diagram of an example embodiment of a method 300 for providing Random Access Channel (RACH) response preamble prioritization. The method begins with processing block 301 which discloses receiving, from a RACH receiver at a Preamble Prioritization Element (PPE), a list of detected preambles from a plurality of User Equipment (UE) devices, the preambles having a configured priority for different preamble groups.

Processing block 302 shows providing, by the PPE, an ordered prioritized list of the detected preambles. As shown in processing block 303 a prioritized preamble indicates that access to a cell is required due to an incoming handover.

Processing block 304 recites forwarding, by the PPE to a RACH response element, a predetermined number of detected preambles from the ordered prioritized list. Processing block 305 discloses wherein the predetermined number of detected preambles comprises 64 preambles.

Processing block 306 states sending a first Random Access Response (RAR) message to a UE that sent a dedicated preamble based on ordered prioritized list. Processing block 307 recites configuring, by an operator, a priority of different preamble groups of UEs.

Figure 4:
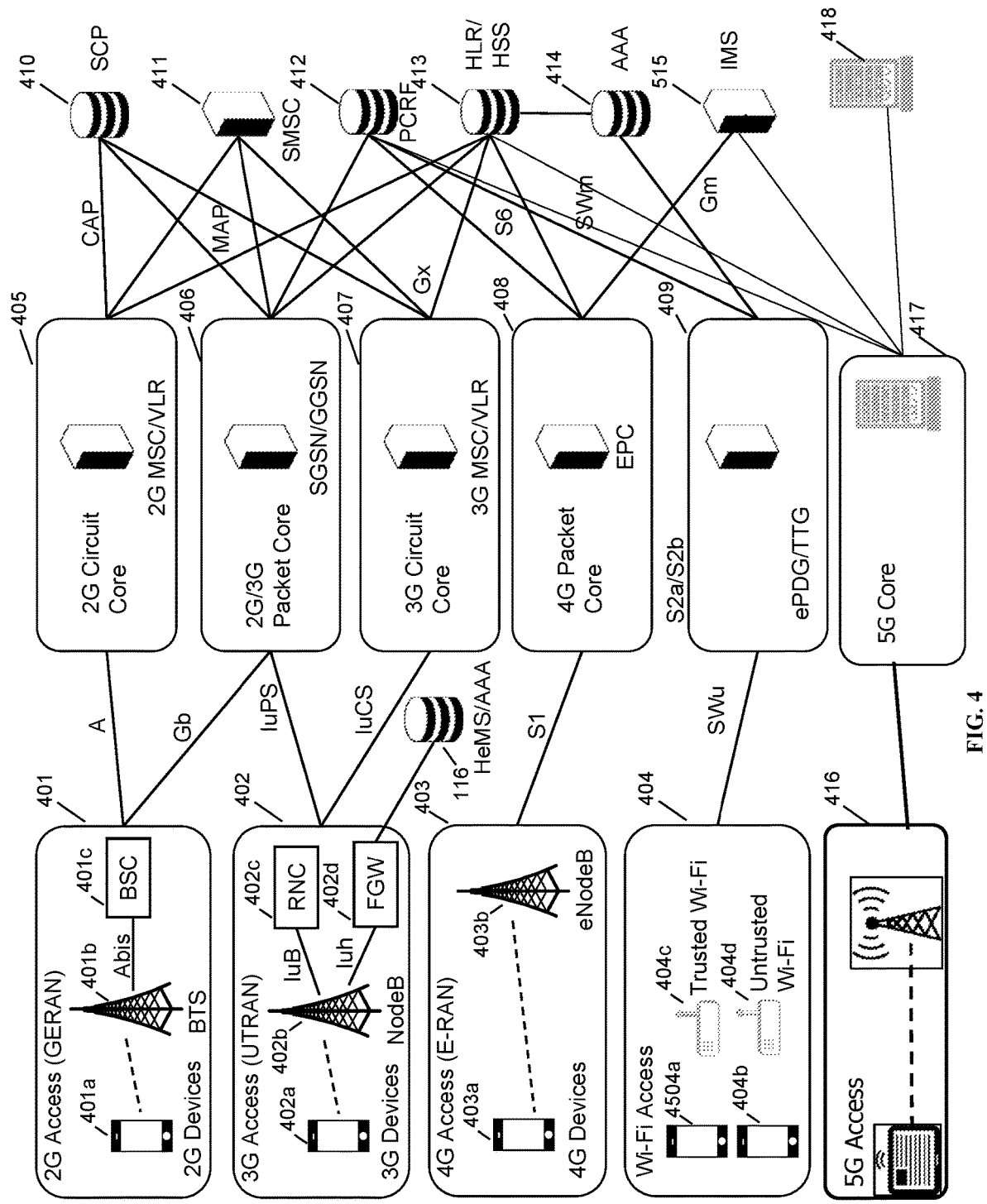
FIG. 4 is a schematic network architecture diagram for 3G and other-G prior art networks.

FIG. 4 is a schematic network architecture diagram for 3G and other-G prior art networks. The diagram shows a plurality of "Gs," including 2G, 3G, 4G, 5G and Wi-Fi. 2G is represented by GERAN 401, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 5G core 417 is shown using a single interface to 5G access 416, although in some cases 5G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Iub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. The present invention is also applicable for 5G networks since the same or equivalent functions are available in 5G. Where 4G or LTE is mentioned herein, 5G is understood to be contemplated by the inventors. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 5:
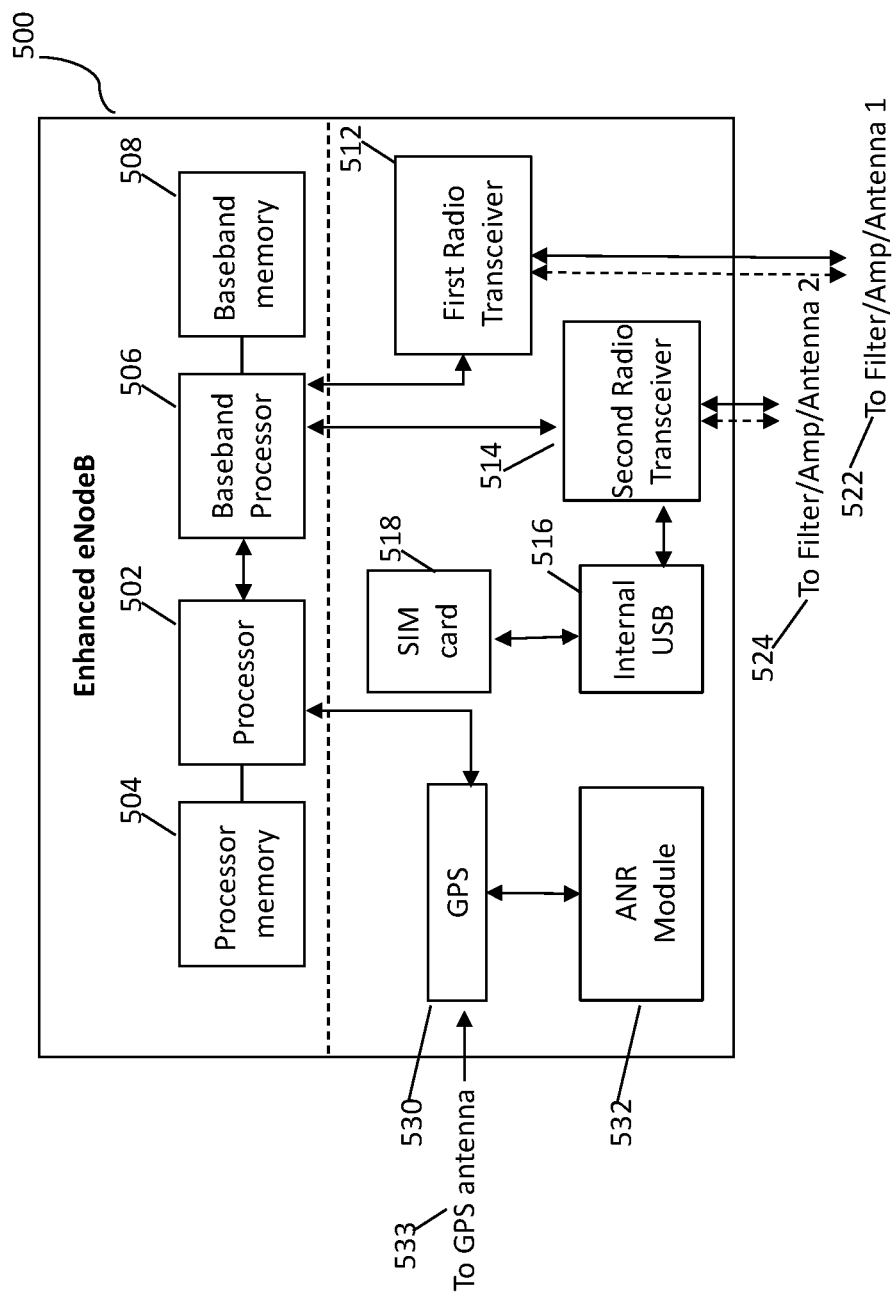
FIG. 5 is an enhanced eNodeB for performing the methods described herein, in accordance with some embodiments.

FIG. 5 is a diagram of an enhanced eNodeB for performing the methods described herein, in accordance with some embodiments. eNodeB 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein. Other elements and/or modules may also be included, such as a home eNodeB, a local gateway (LGW), a self-organizing network (SON) module, or another module. Additional radio amplifiers, radio transceivers and/or wired network connections may also be included.

Figure 6:
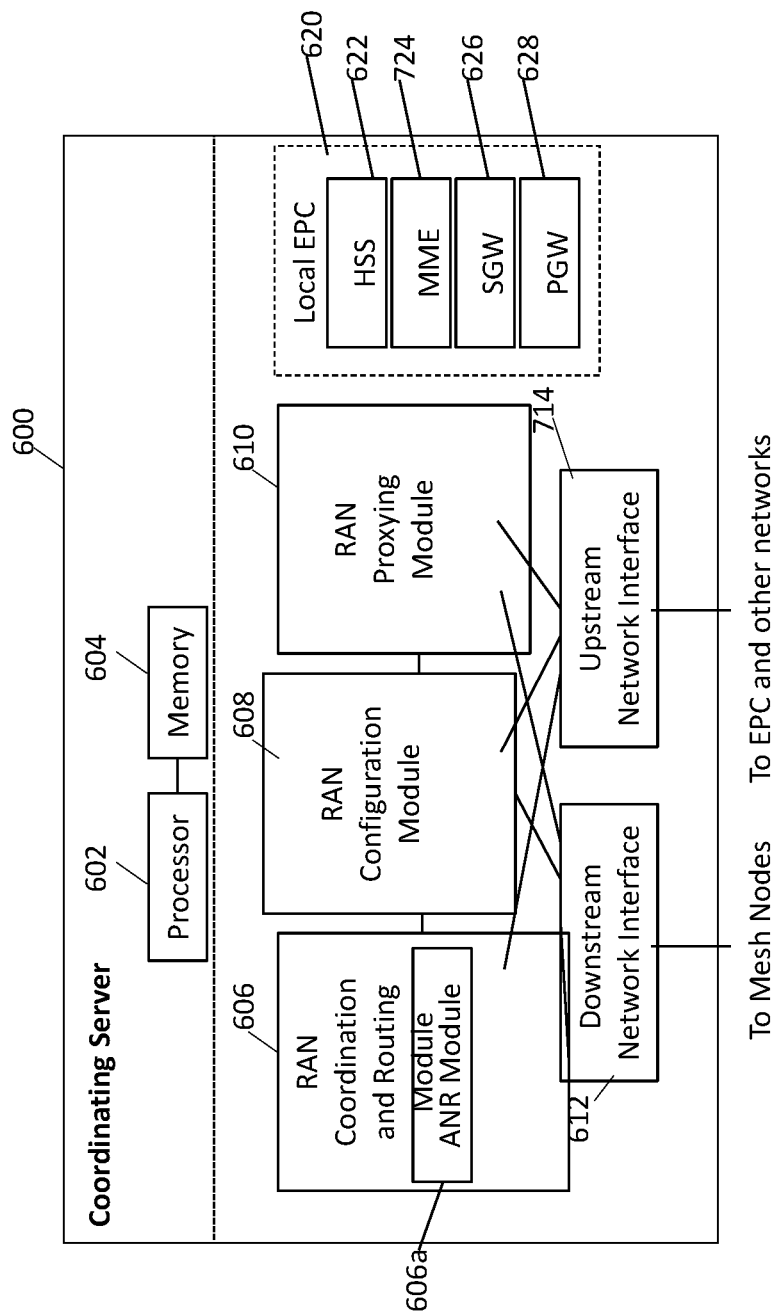
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing Random Access Channel (RACH) response preamble prioritization, the method comprising:
   receiving, from a RACH receiver at a Preamble Prioritization Element (PPE), a list of detected preambles from a plurality of User Equipment (UE) devices, the preambles having a configured priority for different preamble groups;
   providing, by the PPE, an ordered prioritized list of the detected preambles;
   forwarding, by the PPE to a RACH response element, a predetermined number of detected preambles from the ordered prioritized list; and
   sending a first Random Access Response (RAR) message to a UE that sent a dedicated preamble based on the ordered prioritized list.

2. The method of claim 1 further comprising configuring, by an operator, a priority of different preamble groups of UEs.

3. The method of claim 1 wherein the predetermined number of detected preambles comprises 64 preambles.

4. The method of claim 1 wherein a prioritized preamble indicates that access to a cell is required due to an incoming handover.

5. A non-transitory computer-readable medium containing instructions for providing Random Access Channel (RACH) response preamble prioritization, which, when executed, cause a system to perform steps comprising:
   receiving, from a RACH receiver at a Preamble Prioritization Element (PPE), a list of detected preambles from a plurality of User Equipment (UE) devices, the preambles having a configured priority for different preamble groups;
   providing, by the PPE, an ordered prioritized list of the detected preambles;
   forwarding, by the PPE to a RACH response element, a predetermined number of detected preambles from the ordered prioritized list; and
   sending a first Random Access Response (RAR) message to a UE that sent a dedicated preamble based on the ordered prioritized list.

6. The non-transitory computer-readable medium of claim 5 further comprising instructions for configuring, by an operator, a priority of different preamble groups of UEs.

7. The non-transitory computer-readable medium of claim 5 wherein the predetermined number of detected preambles comprises 64 preambles.

8. The non-transitory computer-readable medium of claim 5 wherein a prioritized preamble indicates that access to a cell is required due to an incoming handover.

9. A system for providing Random Access Channel (RACH) response preamble prioritization, comprising:
   a Preamble Prioritization Element (PPE);
   a RACH receiver in communication with the PPE;
   a RACH response element in communication with the PPE;
   wherein the PPE receives, from the RACH receiver, a list of detected preambles from a plurality of User Equipment (UE) devices, the preambles having a configured priority for different preamble groups;
   wherein the PPE provides an ordered prioritized list of the detected preambles;
   wherein the PPE forwards to the RACH response element, a predetermined number of detected preambles from the ordered prioritized list; and
   wherein the PPE sends a first Random Access Response (RAR) message to a UE that sent a dedicated preamble based on the ordered prioritized list.

10. The system of claim 9 further wherein an operator configures a priority of different preamble groups of User Equipments (UEs).

11. The system of claim 9 wherein the predetermined number of detected preambles comprises 64 preambles.

12. The system of claim 9 wherein a prioritized preamble indicates that access to a cell is required due to an incoming handover.

* * * * *